(12) United States Patent
Raghavendra et al.

(10) Patent No.: US 11,302,307 B2
(45) Date of Patent: Apr. 12, 2022

(54) SYSTEM AND METHOD FOR F0 TRANSFER LEARNING FOR IMPROVING F0 PREDICTION WITH DEEP NEURAL NETWORK MODELS

(71) Applicant: Genesys Telecommunications Laboratories, Inc., Daly City, CA (US)

(72) Inventors: Elluru Veera Raghavendra, Hyderabad (IN); Aravind Ganapathiraju, Hyderabad (IN)

( * ) Notice: Subject to any disclaimer, the term of this patent is extended or adjusted under 35 U.S.C. 154(b) by 189 days.

(21) Appl. No.: 16/448,384

(22) Filed: Jun. 21, 2019

(65) Prior Publication Data

US 2019/0392815 A1 Dec. 26, 2019

Related U.S. Application Data

(60) Provisional application No. 62/688,448, filed on Jun. 22, 2018.

(51) Int. Cl.

| | |
|---|---|
| *G10L 15/16* | (2006.01) |
| *G10L 15/06* | (2013.01) |
| *G06K 9/62* | (2022.01) |
| *G10L 13/04* | (2013.01) |
| *G10L 15/18* | (2013.01) |

(52) U.S. Cl.
CPC .......... *G10L 15/063* (2013.01); *G06K 9/6256* (2013.01); *G10L 13/04* (2013.01); *G10L 15/16* (2013.01); *G10L 15/18* (2013.01)

(58) Field of Classification Search
CPC ....... G10L 15/063; G10L 15/16; G10L 15/18; G10L 13/04; G06K 9/6256
See application file for complete search history.

(56) References Cited

U.S. PATENT DOCUMENTS

2018/0336882 A1* 11/2018 Reber .................. G06K 9/6262
2019/0156210 A1* 5/2019 He ....................... G06N 3/0481

OTHER PUBLICATIONS

Y. Qian, Y. Fan, W. Hu and F. K. Soong, "On the training aspects of Deep Neural Network (DNN) for parametric TTS synthesis," 2014 IEEE International Conference on Acoustics, Speech and Signal Processing (ICASSP), Florence, Italy, 2014, pp. 3829-3833, doi: 10.1109/ICASSP.2014.6854318. (Year: 2014).*

Fan, Yuchen; Qian, Yao; Xie, Feng-Long; Soong, Frank K. (2014): "TTS synthesis with bidirectional LSTM based recurrent neural networks", In INTERSPEECH-2014, 1964-1968.), (Year: 2014).*

Zhu, Pengcheng; Xie, Lei; Chen, Yunlin (2015): "Articulatory movement prediction using deep bidirectional long short-term memory based recurrent neural networks and word/phone embeddings", In INTERSPEECH-2015, 2192-2196 (Year: 2015).*

(Continued)

*Primary Examiner* — Edgar X Guerra-Erazo
*Assistant Examiner* — Athar N Pasha

(57) ABSTRACT

A system and method are presented for F0 transfer learning for improving F0 prediction with deep neural network models. Larger models are trained using long short-term memory (LSTM) and multi-layer perceptron (MLP) feed-forward hidden layer modeling. The fundamental frequency values for voiced and unvoiced segments are identified and extracted from the larger models. The values for voiced regions are transferred and applied to training a smaller model and the smaller model is applied in the text to speech system for real-time speech synthesis output.

16 Claims, 6 Drawing Sheets

(56) References Cited

OTHER PUBLICATIONS

R. Li, Z. Wu, Y. Huang, J. Jia, H. Meng and L. Cai, "Emphatic Speech Generation with Conditioned Input Layer and Bidirectional LSTMS for Expressive Speech Synthesis," 2018 IEEE International Conference on Acoustics, Speech and Signal Processing (ICASSP), Calgary, AB, Canada, 2018, pp. 5129-5133 (Year: 2018).*
B. P. Tóth and T. G. Csapó, "Continuous fundamental frequency prediction with deep neural networks," 2016 24th European Signal Processing Conference (EUSIPCO), Budapest, Hungary, 2016, pp. 1348-1352, doi: 10.1109/EUSIPCO.2016.7760468. (Year: 2016).*
A. Senior H. Zen and M. Schuster; "Statistical parametric speech synthesis using deep neural networks," in Proc. IEEE Int. Conf. on Acoustics, Speech, and Signal Processing (ICASSP), 2013.
O. Watts Z. Wu, C. Valentini-Botinhao and S. King; "Deep neural networks employing multi-task learning and stacked bottleneck features for speech synthesis," in Proc. IEEE. Int. Conf. on Acoustics, Speech and Signal Processing (ICASSP), 2015.
W. Hu Y. Qian, Y. Fan and F. K. Soong; "On the training aspects of deep neural network (dnn) for parametric tts synthesis," in Proc. IEEE Int. Conf. on Acoustics, Speech, and Signal Processing (ICASSP), 2014.
Masuko T. Kobayashi T. Yoshimura T., Tokuda K. and Kitamura T.; "Simultaneous modeling of spectrum, pitch and duration in hmm based speech synthesis," in Proceedings of EUROSPEECH, 1999.
S. King H. Lu and O. Watts, "Combining a vector space representation of linguistic context with a deep neural network for text-to-speech synthesis," in Proc. the 8th ISCE Speech Synthesis Workshop (SSW), 2013.
X. Qian S. Kang and H. Meng; "Multidistribution deep belief network for speech synthesis," in Proc. IEEE Int. Conf. on Acoustics, Speech, and Signal Processing (ICASSP), 2013.
Z. Wu, O. Watts and S. King; "Merlin: An open source neural network speech synthesis system", in Proc. 9th ISCA Speech Synthesis Workshop (SSW9), Sep. 2016.
L. Deng Z.-H. Ling and D. Yu; "Modeling spectral envelopes using restricted boltzmann machines for statistical parametric speech synthesis," in Proc. IEEE Int. Conf. on Acoustics, Speech, and Signal Processing (ICASSP), 2013.
Masuko T. Kobayashi T. Tokuda K., Yoshimura T. and Kitamura T.; "Speech parameter generation algorithms for hmm based speech synthesis," in Proceedings of IEEE Int. Conf. Acoust., Speech, and Signed Processing, 2000.
M. Morise, F. Yokomori, K. Ozawa; "World: a vocoder-based high-quality speech synthesis system for real-time application," in IEICE transactions on information and systems, 2016.
Alan W. Black; "Clustergen: a statistical parametric synthesizer using trajectory modeling," Proceedings of Interspeech, 2006.

* cited by examiner

400

| language | System | MCD | F0 RMSE | CORR | BAP |
|---|---|---|---|---|---|
| en-US | Large | 5.105 | 23.9 | 0.709 | 0.192 |
| | Small | 5.389 | 25.614 | 0.654 | 0.201 |
| | Transfer | 5.247 | 24.997 | 0.686 | 0.198 |
| ja-JP | Large | 5.484 | 33.431 | 0.745 | 0.148 |
| | Small | 5.554 | 36.922 | 0.682 | 0.150 |
| | Transfer | 5.456 | 35.043 | 0.720 | 0.152 |

FIG 4

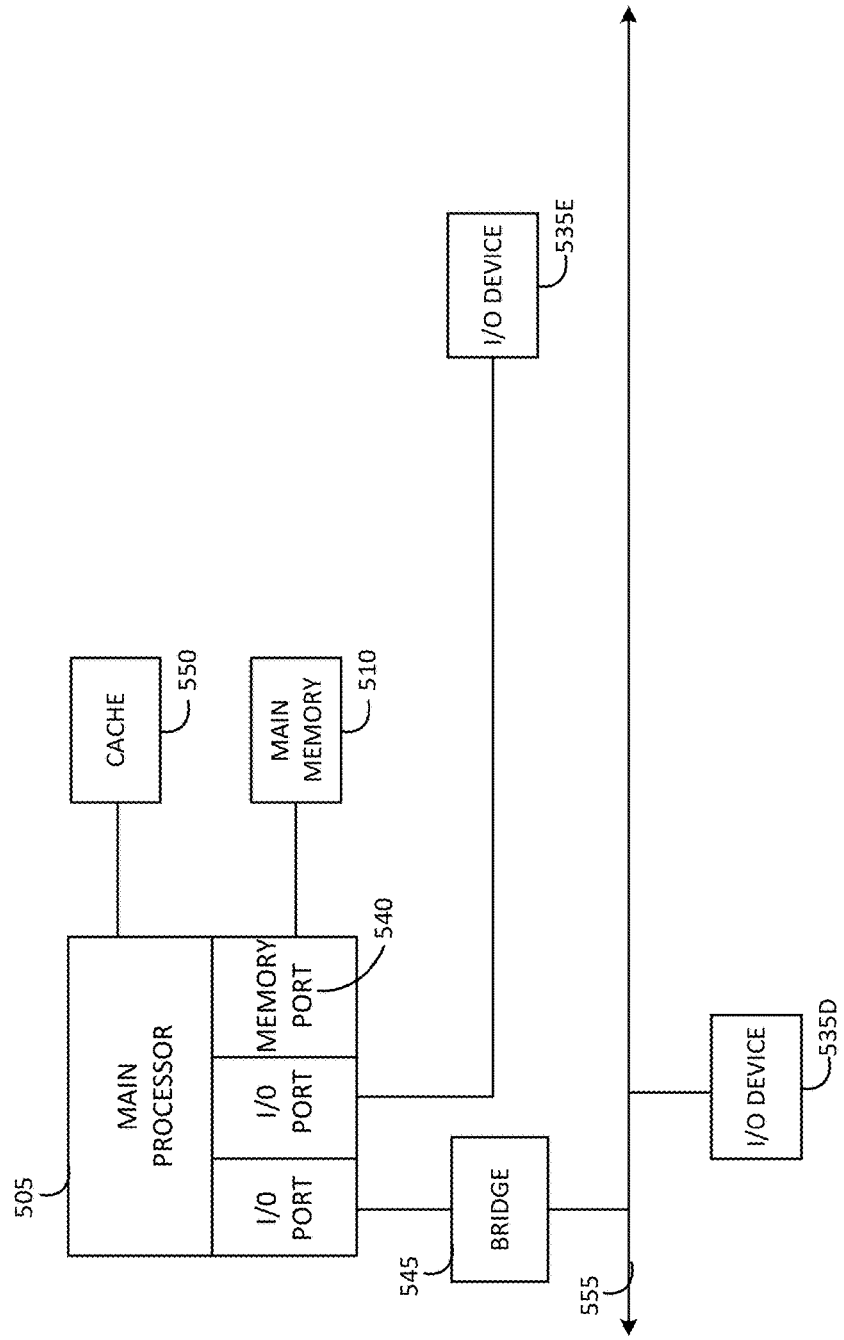

SYSTEM AND METHOD FOR F0 TRANSFER LEARNING FOR IMPROVING F0 PREDICTION WITH DEEP NEURAL NETWORK MODELS

CROSS REFERENCE TO RELATED APPLICATION

This application claims the benefit of U.S. Provisional Patent Application No. 62/688,448, titled "F0 TRANSFER LEARNING FOR IMPROVING F0 PREDICTION WITH DEEP NEURAL NETWORK MODELS", filed in the U.S. Patent and Trademark Office on Jun. 22, 2018, the contents of which are incorporated herein.

BACKGROUND

The present invention generally relates to telecommunications systems and methods, as well as text to speech systems. More particularly, the present invention pertains to modeling within the text to speech systems.

SUMMARY

A system and method are presented for F0 transfer learning for improving F0 prediction with deep neural network models. Larger models are trained using long short-term memory (LSTM) and multi-layer perceptron (MLP) feed-forward hidden layer modeling. The fundamental frequency values for voiced and unvoiced segments are identified and extracted from the larger models. The values for voiced regions are transferred and applied to training a smaller model and the smaller model is applied in the text to speech system for real-time speech synthesis output.

In one embodiment, a method is presented for fundamental frequency transfer learning in model training in a text to speech synthesis system using deep neural networks with lesser nodes and hidden layers for obtaining high quality output comprising the steps of: training a larger model using long short-term memory and multi-layer perceptron feed-forward hidden layer modeling; identifying and extracting fundamental frequency values for voiced and unvoiced regions from the larger model; transferring and applying the fundamental frequency values for voiced regions extracted from the larger model in training a smaller model; and applying the smaller model in the text to speech system for real-time speech synthesis output.

In an embodiment, the training of the larger model utilizes three feed-forward hidden layers comprising 1024 nodes and a LSTM hidden layer comprising 512 nodes.

In an embodiment, the fundamental frequency values are continuous values where the zero and undefined values for unvoiced regions are not applied.

In an embodiment, the smaller model utilizes three feed-forward hidden layers comprising 128 nodes and a LSTM hidden layer comprising 256 nodes.

The transferring and applying of the fundamental frequency values further comprises applying a hyperbolic tangent activation function in the lower layers and a linear activation function at the output layer.

In another embodiment, a method is presented for fundamental frequency transfer learning in model training in a text to speech synthesis system using deep neural networks with lesser nodes and hidden layers for obtaining high quality output comprising the steps of: training a first model using feed-forward hidden layer modeling; identifying and extracting fundamental frequency values for a plurality of regions of speech input using the first model; transferring and applying the fundamental frequency values for the specified regions of the plurality of regions extracted from the first model in training a second model; and applying the second model in the text to speech system for real-time speech synthesis output.

In an embodiment, the training of the first model utilizes three feed-forward hidden layers comprising 1024 nodes and a LSTM hidden layer comprising 512 nodes.

In an embodiment, the fundamental frequency values are continuous values where the zero and undefined values for unvoiced regions are not applied.

In an embodiment, the second model utilizes three feed-forward hidden layers comprising 128 nodes and a LSTM hidden layer comprising 256 nodes.

The transferring and applying of the fundamental frequency values further comprises applying a hyperbolic tangent activation function in the lower layers and a linear activation function at the output layer.

In an embodiment, the first model is larger than the second model.

BRIEF DESCRIPTION OF THE DRAWINGS

FIG. 4 is a table illustrating scores for embodiments of DNN systems.

FIG. 5B is a diagram illustrating an embodiment of a computing device.

DETAILED DESCRIPTION

Figure 1:
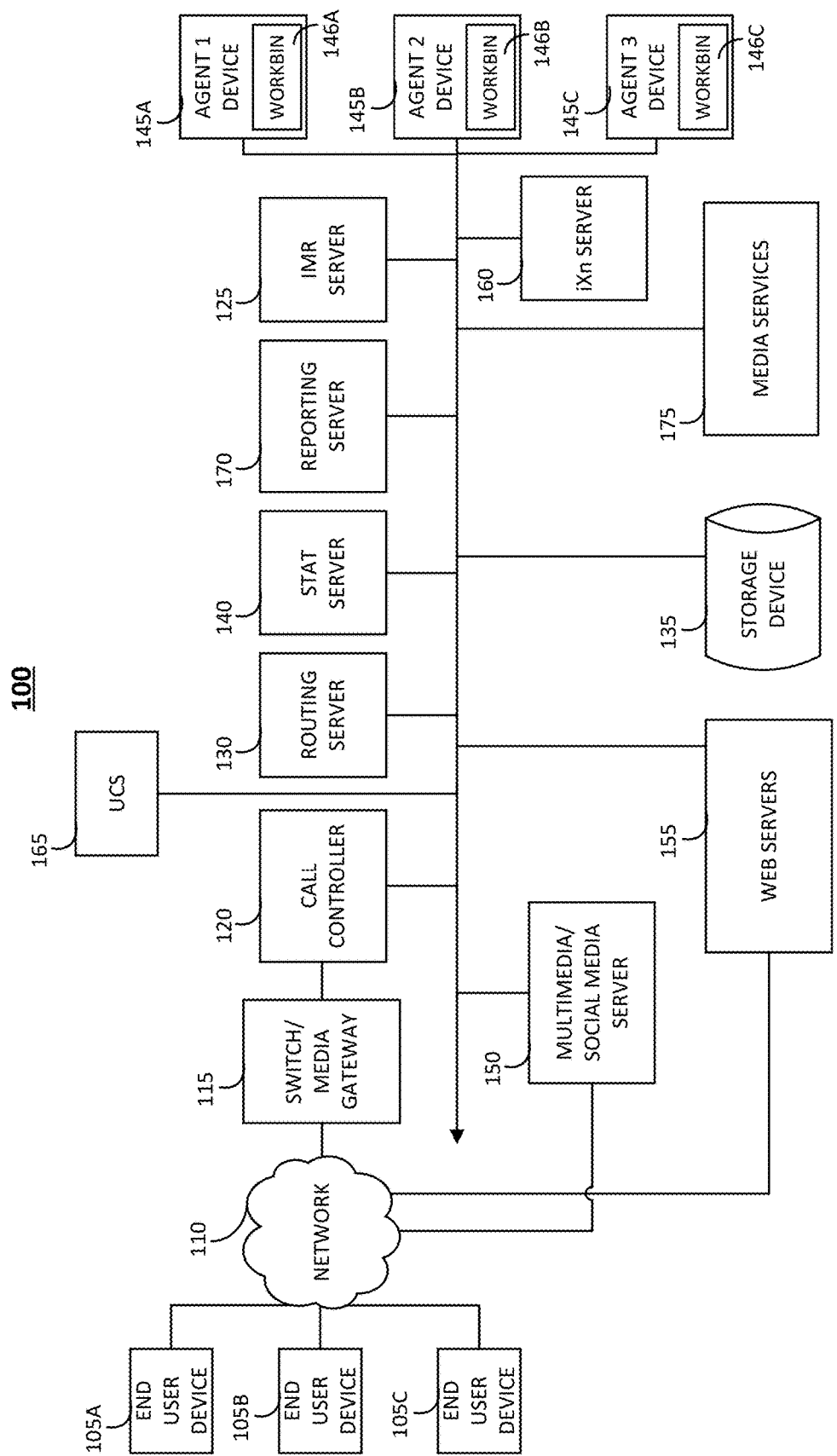
FIG. 1 is a diagram illustrating an embodiment of a contact center.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Text to Speech (TTS) is an essential component in modern applications, such as interactive voice response (IVR) systems, navigation systems, visually impaired devices, etc. TTS systems use a unit selection approach, statistical parametric speech synthesis, or a hybrid of the two. The fundamental frequency (F0) in TTS systems is important for producing natural and expressive synthesized speech. The F0 prediction in TTS systems that is perceived as being natural and expressive to a task remains a challenging obstacle. Although unit-selection systems are able to reproduce the inherent natural prosody of the segments, they often sound discontinuous or produce prosody whose short-term naturalness does not reflect the long-term structure of the input.

Efforts in improving the quality of acoustic models for statistical parametric speech synthesis (SPSS) have been made in the field, such as modeling between text and acoustic parameters during the training process and estimating/generating speech parameter trajectories during synthesis. Neural networks have re-emerged as a potential acoustic model for SPSS. Deep feedforward neural networks (DNN) have been used for modeling acoustic parameters given the contextual features of input text. Weaknesses in HMM-based SPSS include the density function over the acoustic features (usually a Gaussian) and the decision-tree driven parameterization of the model in which parameters must be shared across groups of linguistic contexts. DNNs addresses these weaknesses and are able to produce high quality speech when used in combination with three or more layers of feed-forward and LSTM hidden layers. DNNs may be viewed as a replacement for decision trees. This approach maps linguistic features directly to the corresponding acoustic features through multiple layers of hidden representations, frame by frame. Exploration in this area has included multiple architectures using only feed-forward hidden layers and a combination of feed-forward and LSTM hidden layers with bi-directional LSTM layers (Yokomori, F., et al., "Merlin: An open source neural network speech synthesis system", *Proc. 9$^{th}$ ISCA Speech Synthesis Workshop (SSW9)*, September 2019). While the networks were able to obtain better results using four feed-forward hidden layers with 1024 nodes and 384 nodes of BLSTM hidden layers, such large networks require a lot of memory are time intensive in real-time applications and low-memory devices. F0 transfer learning from larger networks to smaller networks is applied in embodiments described herein, with results showing that smaller models with transfer learning are able to produce similar quality of larger models.

Contact Center Systems

FIG. 1 is a diagram illustrating an embodiment of a communication infrastructure, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a stat server 140; a plurality of agent devices 145A, 145B, 145C comprising workbins 146A, 146B, 146C; a multimedia/social media server 150; web servers 155; an iXn server 160; a UCS 165; a reporting server 170; and media services 175.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other end users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a private or public switched telephone network (PSTN), local area network (LAN), private wide area network (WAN), and/or public WAN such as the Internet, to name a non-limiting example. The network 110 may also include a wireless carrier network including a code division multiple access (CDMA) network, global system for mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with computer-telephony integration (CTI) software for interfacing with the switch/media gateway and contact center equipment. In an embodiment, the call controller 120 may include a session initiation protocol (SIP) server for processing SIP calls. The call controller 120 may also extract data about the customer interaction, such as the caller's telephone number (e.g., the automatic number identification (ANI) number), the customer's internet protocol (IP) address, or email address, and communicate with other components of the system 100 in processing the interaction.

In an embodiment, the system 100 further includes an interactive media response (IMR) server 125. The IMR server 125 may also be referred to as a self-help system, a virtual assistant, etc. The IMR server 125 may be similar to an interactive voice response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140.

In an embodiment, the routing server 130 may query a customer database, which stores information about existing clients, such as contact information, service level agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. Collected information about the customer and/or the customer's historical information may also be provided to the agent device for aiding the agent in better servicing the communication and additionally to the contact center admin/supervisor device for managing the contact center. In this regard, each device 145 may include a telephone adapted for regular telephone calls, VoIP calls, etc. The device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, web real-time communication (WebRTC), etc. Widgets may be deployed on the websites hosted on the web servers 155.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a customer relations management (CRM) database hosted in the mass storage device 135 or elsewhere. The mass storage device 135 may take form of a hard disk or disk array as is conventional in the art.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a reporting server 170 configured to generate reports from data aggregated by the statistics server 140. Such reports may include near real-time reports or historical reports concerning the state of resources, such as, for example, average wait time, abandonment rate, agent occupancy, etc. The reports may be generated automatically or in response to specific requests from a requestor (e.g., agent/administrator, contact center application, etc.).

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In an embodiment, the terms "interaction" and "communication" are used interchangeably, and generally refer to any real-time and non-real-time interaction that uses any communication channel including, without limitation, telephony calls (PSTN or VoIP calls), emails, vmails, video, chat, screen-sharing, text messages, social media messages, WebRTC calls, etc.

The media services 175 may provide audio and/or video services to support contact center features such as prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, and keyword spotting.

In an embodiment, the premises-based platform product may provide access to and control of components of the system 100 through user interfaces (UIs) present on the agent devices 145A-C. Within the premises-based platform product, the graphical application generator program may be integrated which allows a user to write the programs (handlers) that control various interaction processing behaviors within the premises-based platform product.

As noted above, the contact center may operate as a hybrid system in which some or all components are hosted remotely, such as in a cloud-based environment. For the sake of convenience, aspects of embodiments of the present invention will be described below with respect to providing modular tools from a cloud-based environment to components housed on-premises.

Text to Speech Systems

Figure 2:
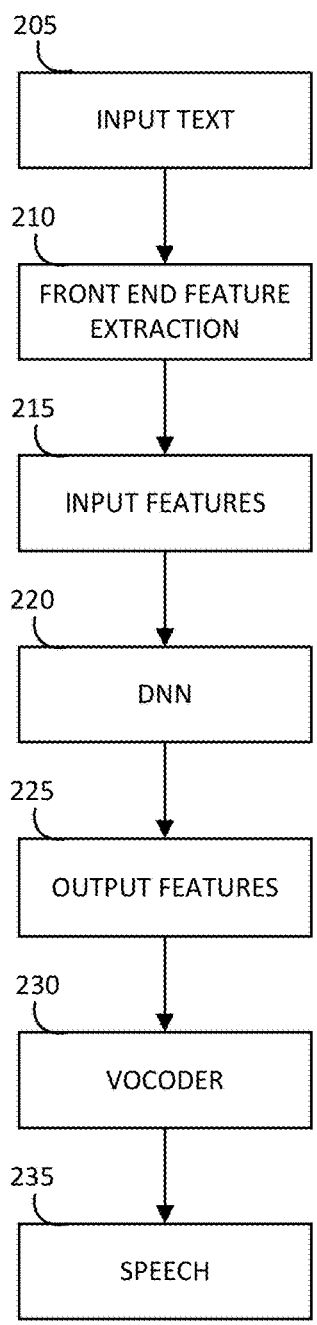
FIG. 2 is a diagram illustrating an embodiment of a for text to speech system.
Figure 3:
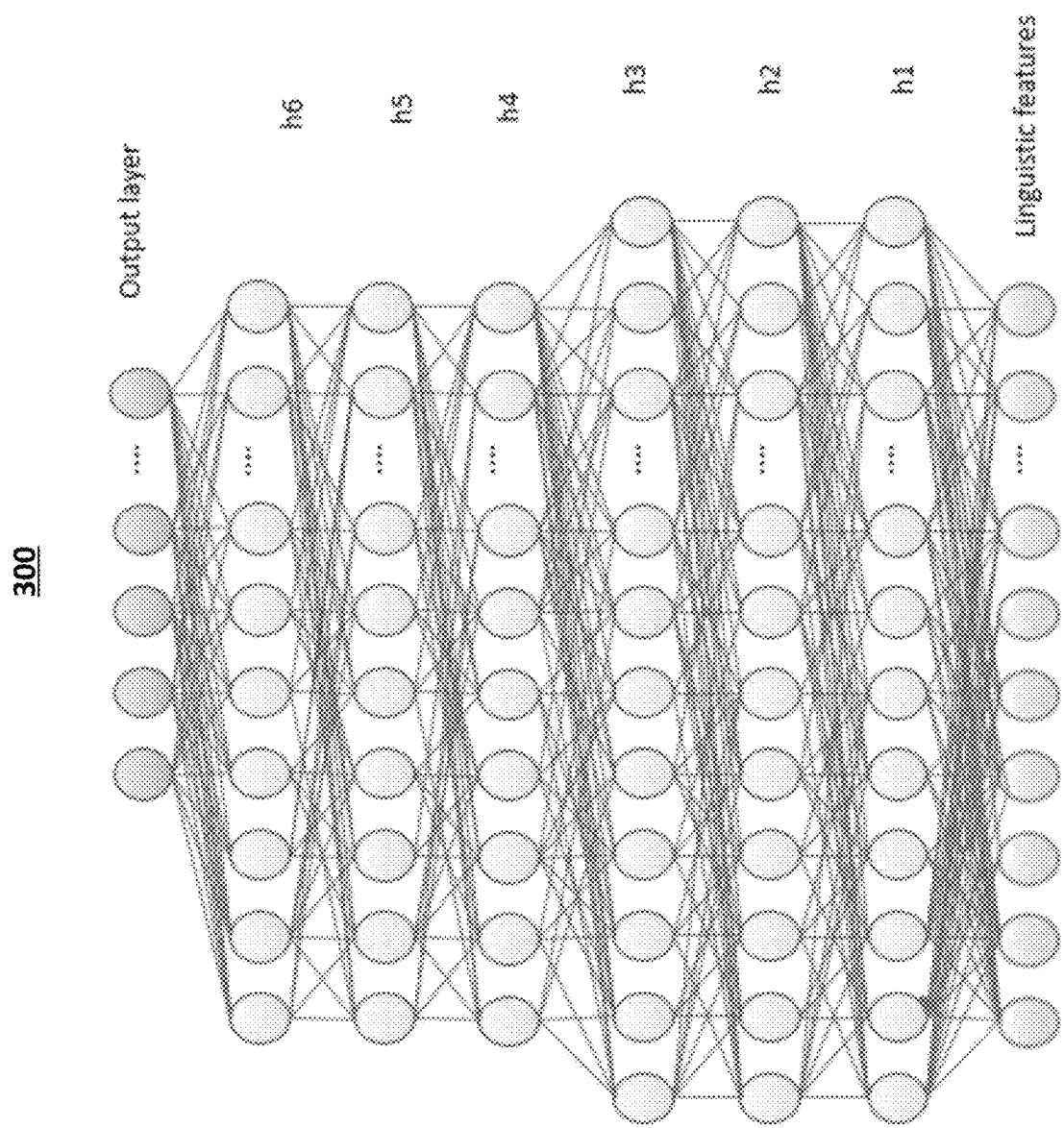
FIG. 3 is an illustration of an embodiment of DNN network architecture.

FIG. 2 is a diagram illustrating an embodiment of a TTS system employing a DNN, indicated generally at 200. Components of the system 200 might include: input text 205, a front end 210, input features 215, a DNN 220, output features 225, a vocoder 230, and synthesized speech 235. FIG. 3 is an illustration of an embodiment of DNN network architecture employed during the model learning phase of a TTS system 200 operation, indicated generally at 300, such as the DNN 220 illustrated in FIG. 2.

In an embodiment, the TTS system 200 may be a part of the media services 175 in the contact center system 100. The DNN network architecture 300 may be employed in the TTS system 200 during the model learning phase between given input text and acoustic features. The input text 205 may be represented as $x_t$ and the acoustic features may be represented as $o_t$ 225, where $x_t$ and $o_t$ denotes n-th input features and output features at time t respectively. Input features 215, which are extracted from the input text 205 using a front end 210, comprise values that are binary, numeric, and frame level features. Binary features might comprise: is current phone vowel, consonant, stop, fricative, nasal, liquid, etc. ..., is current syllable has rounded vowel, short vowel, dipthong vowel, etc. ..., what is the current word part of speech tagging, what is the current phrase, tonal, behavior, etc. .... Numerical features might comprise: what is the stress value of the current syllable, number of segments in the syllable, number of syllables in the word, number of stressed syllables in the phrase, etc. .... Frame level features might comprise: duration of the current phoneme, duration of each state, position of current frame in the state and phone, etc. Output features might comprise mel-generalized coefficients, log F0, band aperiodicity, voiced/unvoiced decision and their delta and delta-delta features.

DNN based TTS comprises training and syntheses phases in the TTS system 200. During the training phrase, DNN 220 learns the complex relationship between input linguistic features $x_t$ 215 and output acoustic features $o_n^t$ 225 using feed-forward and LSTM hidden layers. This may be represented mathematically as:

$$o_t = F(x_t) + e$$

Where $F(\bullet)$ is the mapping function realized by the trained DNN 220 and e represents the modelling error. The representation or comprises static features $c_t$, corresponding delta features $\Delta c_t$ and delta-delta features $\Delta\Delta c_t$ and may be mathematically represented as such:

$$o_t = [c_t^T, \Delta c_t^T], [\Delta\Delta c_t^T]^T$$

The dynamic features are used to produce smooth parameter trajectories during the synthesis process. Dynamic features are determined from static features. Hence, a sequence of observed acoustic features $O = [o_0^T, o_1^T, \ldots, o_T^T]$ on can be determined from a sequence of static features $C = [c_0^T, c_T^T, \ldots, c_T^T]^T$ by the mathematical representation:

$$O = WC$$

Where W represents a matrix that contains the coefficients used to compute static, delta and delta-delta features from a sequence of static features represented as C.

Similar to an HMM-based approach, once acoustic parameters are predicted at frame level, speech parameters are smoothed using pre-defined global variance computed using training data. MLPG may be used to smooth trajectories of speech parameter features. Finally, a waveform synthesis module outputs a synthesized waveform given the smoothed speech parameters.

F0 modeling is a complex problem due to the values normally being considered to depend on binary voicing decisions. Thus, the fundamental frequency values are continuous in voiced regions and undefined in unvoiced regions. DNNs attain high quality TTS due to large data for modeling and large architectures (e.g., 6 hidden layers of 1024 nodes or 3 MLP hidden layers of 1024 nodes and 3 LSTM hidden layers of 512 nodes). These large networks have drawbacks, as previously discussed. For larger model training, F0 produces high quality synthesis output and F0 contour is better captured when modeled with LSTM hidden layers.

In an embodiment, the following network architecture for the DNN 220 resulted in better objective scores and subjective evaluations. For a feed-forward hidden layer, the number of layers consisted of 3 layers and the number of nodes was 1024. For an LSTM hidden layer, the number of layers consisted of 3 layers and the number of nodes was 512. A transfer learning approach was used from a larger model to a smaller model. This transfer learning approach in described in greater detail below. Using the larger model, F0 values for training data were predicted along with unvoiced regions to avoid continuous and undefined complexity. The predicted model output was used for training the smaller model. The architecture of the smaller model comprised feed-forward hidden and LSTM hidden layers. For a feed-forward hidden layer, the number of layers consisted of 3 layers and the number of nodes was 128. For a LSTM hidden layer, the number of layers consisted of 1 layer and the number of nodes was 256.

Experiments were conducted on en-US and ja-JP languages. The recordings collected used a professional female speaker for both languages. Voices were recorded using 48 KHz and down sampled during voice training. The corpus was divided into training, development, and validation. For the en-US (English—US) language, 3195 training utterances were used, 100 development utterances, and 100 validation utterances. For the ja-JP (Japanese—Japan) language, 3234 training utterances were used, 100 development utterances, and 100 validation utterances. A vocoder 230, such as WORLD vocoder, was used to extract vocoder parameters, including: 60-dimensional Mel-Generalized Coefficients (MGC's), band aperiodicity (BAPs), and F0 in log-domain. The features were extracted at 5 ms frame steps and the same vocoder was used to reconstruct speech waveform during synthesis to achieve the synthesized speech 235.

In these experiments, three DNN systems were constructed for each desired language using MLP and LSTM layers. The first system comprised a larger system. The large system is based on three feed-forward hidden layers with 1024 nodes and 3 LSTM hidden layers with 512 nodes. The hyperbolic Tangent activation functions are employed in the lower layers, and a linear, activation function at the output layer.

The second system comprised a small system. The small system is implemented using lower network architectures to deploy in the real-time applications, including three feed-forward hidden layers with 128 nodes and 1 LSTM hidden layer with 256 nodes. The hyperbolic Tangent activation functions are employed in the lower layers, and a linear, activation function at the output layer.

The third system is a transfer system implemented using F0 from the larger model output. The F0 values only comprise continuous values. Zero or undefined is not used for unvoiced regions. Three feed-forward hidden layers are used with 128 nodes and 1 LSTM hidden layer with 256 nodes. The hyperbolic Tangent activation functions are employed in the lower layers, and a linear, activation function at the output layer.

Each of the systems employ the same front end 210 to extract linguistic features 215. In an embodiment, the en-US language used 549 binary features, 27 numerical features, and 9 frame level features for model training. The ja-JP language used 917 binary features, 27 numerical features, and 9 frame level features. The input features were normalized between [0.1, 0.99].

For the output vocoder parameters, F0 was linearly interpolated before modelling, and a binary feature was used to record the voiced/unvoiced information for each frame.

Delta and delta-delta features were determined for MGCs, BAPs, and F0. In total, there were (3*(60+1+1)+1)=187 features in the output. Mean-variance normalization was applied to the output acoustic features such that they had zero mean and unit variance across the training set.

The hyper-parameters (ie., the number of hidden layers, the number of hidden units, learning rate, momentum, etc.) of all neural networks were tuned on the development set through objective measures, including MCD, F0 RMSE, CORR, and BAP.

Mel-Cepstral Distortion (MCD) is computed to estimate MGC's prediction performance. MCD may be defined as a Euclidean Distance represented as:

$$mcd = (10/\ln 10) * \sqrt{2 * \sum_{i=1}^{41} (mc_i^t - mc_i^e)^2}$$

Root Mean Squared Error (RMSE) is used to measure F0 prediction performance. F0 is modelled on a log domain, but error is calculated on a linear-scale.

Correction (CORR) is determined to analyze the F0 prediction.

RMSE is used to measure BAP prediction performance and is later divided by 10.

For all of the above objective scores, a lower value indicates better performance except for CORR. Results are illustrated in FIG. 4. FIG. 4 is a table illustrating scores for embodiments of DNN systems, indicated generally at 400. Objective results for the three systems showed that the Transfer system (F0 transfer learning from a larger network to a smaller network) performs better, producing better quality synthesized speech 235 than only small model use, and results in quality that is similar to that of the larger models.

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 5A, 5B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JSON.

Figure 5A:
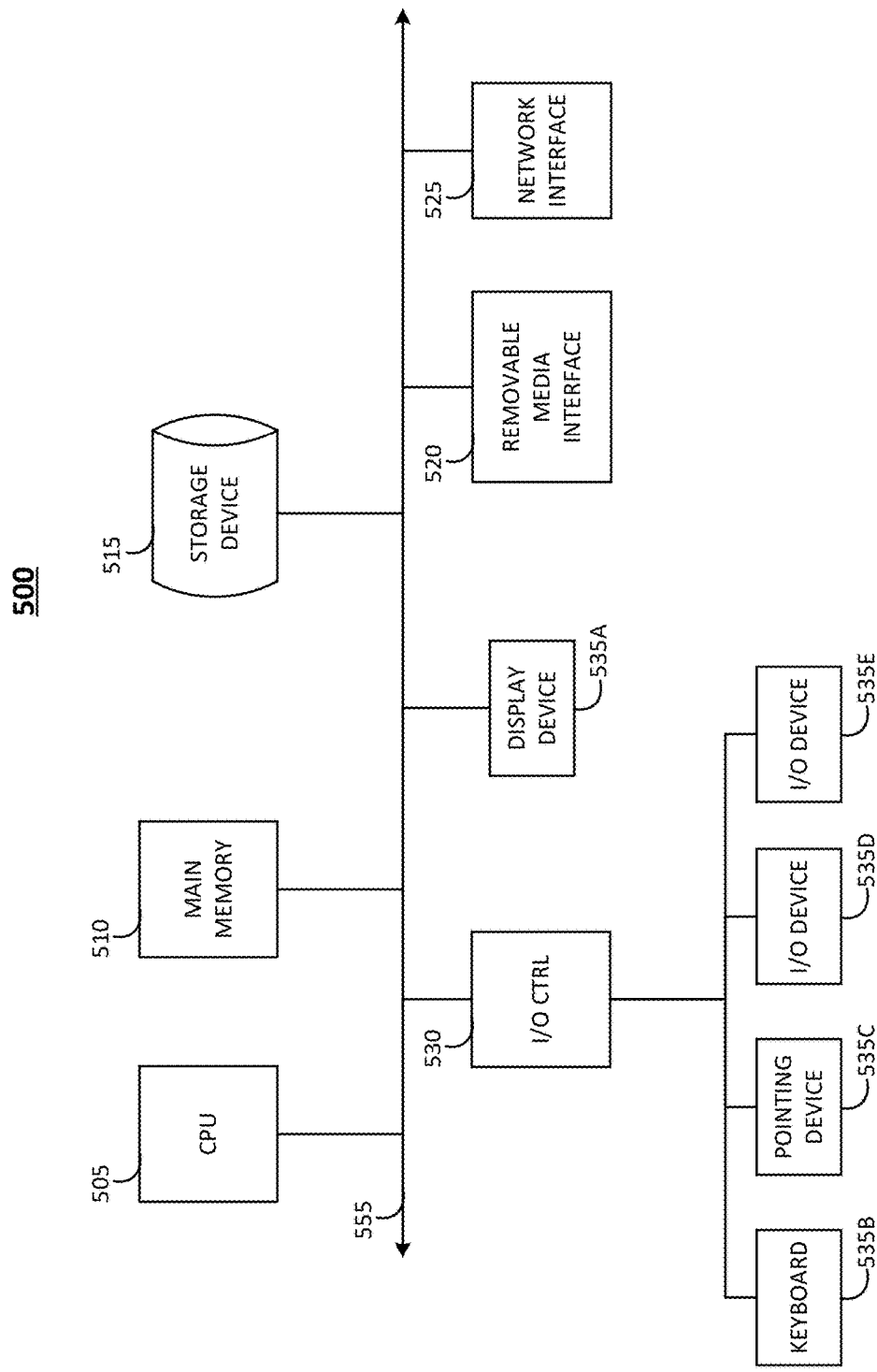
FIG. 5A is a diagram illustrating an embodiment of a computing device.

FIGS. 5A and 5B are diagrams illustrating an embodiment of a computing device as may be employed in an embodiment of the invention, indicated generally at 500. Each computing device 500 includes a CPU 505 and a main memory unit 510. As illustrated in FIG. 5A, the computing device 500 may also include a storage device 515, a removable media interface 520, a network interface 525, an input/output (I/O) controller 530, one or more display devices 535A, a keyboard 535B and a pointing device 535C (e.g., a mouse). The storage device 515 may include, without limitation, storage for an operating system and software. As shown in FIG. 5B, each computing device 500 may also include additional optional elements, such as a memory port 540, a bridge 545, one or more additional input/output devices 535D, 535E, and a cache memory 550 in communication with the CPU 505. The input/output devices 535A, 535B, 535C, 535D, and 535E may collectively be referred to herein as 535.

The CPU 505 is any logic circuitry that responds to and processes instructions fetched from the main memory unit 510. It may be implemented, for example, in an integrated circuit, in the form of a microprocessor, microcontroller, or graphics processing unit, or in a field-programmable gate array (FPGA) or application-specific integrated circuit (ASIC). The main memory unit 510 may be one or more memory chips capable of storing data and allowing any storage location to be directly accessed by the central processing unit 505. As shown in FIG. 5A, the central processing unit 505 communicates with the main memory 510 via a system bus 555. As shown in FIG. 5B, the central processing unit 505 may also communicate directly with the main memory 510 via a memory port 540.

In an embodiment, the CPU 505 may include a plurality of processors and may provide functionality for simultaneous execution of instructions or for simultaneous execution of one instruction on more than one piece of data. In an embodiment, the computing device 500 may include a parallel processor with one or more cores. In an embodiment, the computing device 500 comprises a shared memory parallel device, with multiple processors and/or multiple processor cores, accessing all available memory as a single global address space. In another embodiment, the computing device 500 is a distributed memory parallel device with multiple processors each accessing local memory only. The computing device 500 may have both some memory which is shared and some which may only be accessed by particular processors or subsets of processors. The CPU 505 may include a multicore microprocessor, which combines two or more independent processors into a single package, e.g., into a single integrated circuit (IC). For example, the computing device 500 may include at least one CPU 505 and at least one graphics processing unit.

In an embodiment, a CPU 505 provides single instruction multiple data (SIMD) functionality, e.g., execution of a single instruction simultaneously on multiple pieces of data. In another embodiment, several processors in the CPU 505 may provide functionality for execution of multiple instructions simultaneously on multiple pieces of data (MIMD). The CPU 505 may also use any combination of SIMD and MIMD cores in a single device.

FIG. 5B depicts an embodiment in which the CPU 505 communicates directly with cache memory 550 via a secondary bus, sometimes referred to as a backside bus. In other embodiments, the CPU 505 communicates with the cache memory 550 using the system bus 555. The cache memory 550 typically has a faster response time than main memory 510. As illustrated in FIG. 5A, the CPU 505 communicates with various I/O devices 535 via the local system bus 555. Various buses may be used as the local system bus 555, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 535A, the CPU 505 may communicate with the display device 535A through an Advanced Graphics Port (AGP). FIG. 5B depicts an embodiment of a computer 500 in which the CPU 505 communicates directly with I/O device 535E. FIG. 5B also depicts an embodiment in which local buses and direct communication are mixed: the CPU 505 communicates with I/O device 535D using a local system bus 555 while communicating with I/O device 535E directly.

A wide variety of I/O devices 535 may be present in the computing device 500. Input devices include one or more keyboards 535B, mice, trackpads, trackballs, microphones, and drawing tables, to name a few non-limiting examples. Output devices include video display devices 535A, speakers and printers. An I/O controller 530 as shown in FIG. 5A, may control the one or more I/O devices, such as a keyboard 535B and a pointing device 535C (e.g., a mouse or optical pen), for example.

Referring again to FIG. 5A, the computing device 500 may support one or more removable media interfaces 520, such as a floppy disk drive, a CD-ROM drive, a DVD-ROM drive, tape drives of various formats, a USB port, a Secure Digital or COMPACT FLASH' memory card port, or any other device suitable for reading data from read-only media, or for reading data from, or writing data to, read-write media. An I/O device 535 may be a bridge between the system bus 555 and a removable media interface 520.

The removable media interface 520 may, for example, be used for installing software and programs. The computing device 500 may further include a storage device 515, such as one or more hard disk drives or hard disk drive arrays, for storing an operating system and other related software, and for storing application software programs. Optionally, a removable media interface 520 may also be used as the storage device. For example, the operating system and the software may be run from a bootable medium, for example, a bootable CD.

In an embodiment, the computing device 500 may include or be connected to multiple display devices 535A, which each may be of the same or different type and/or form. As such, any of the I/O devices 535 and/or the I/O controller 530 may include any type and/or form of suitable hardware, software, or combination of hardware and software to support, enable or provide for the connection to, and use of, multiple display devices 535A by the computing device 500. For example, the computing device 500 may include any type and/or form of video adapter, video card, driver, and/or library to interface, communicate, connect or otherwise use the display devices 535A. In an embodiment, a video adapter may include multiple connectors to interface to multiple display devices 535A. In another embodiment, the computing device 500 may include multiple video adapters, with each video adapter connected to one or more of the display devices 535A. In other embodiments, one or more of the display devices 535A may be provided by one or more other computing devices, connected, for example, to the computing device 500 via a network. These embodiments may include any type of software designed and constructed to use the display device of another computing device as a second display device 535A for the computing device 500. One of ordinary skill in the art will recognize and appreciate the various ways and embodiments that a computing device 500 may be configured to have multiple display devices 535A.

An embodiment of a computing device indicated generally in FIGS. 5A and 5B may operate under the control of an operating system, which controls scheduling of tasks and access to system resources. The computing device 500 may be running any operating system, any embedded operating system, any real-time operating system, any open source operation system, any proprietary operating system, any operating systems for mobile computing devices, or any other operating system capable of running on the computing device and performing the operations described herein.

The computing device 500 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 500 may have different processors, operating systems, and input devices consistent with the device.

In other embodiments, the computing device 500 is a mobile device. Examples might include a Java-enabled cellular telephone or personal digital assistant (PDA), a smart phone, a digital audio player, or a portable media player. In an embodiment, the computing device 500 includes a combination of devices, such as a mobile phone combined with a digital audio player or portable media player.

A computing device 500 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 500 communicates with other computing devices 500 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

In an embodiment, the use of LSH to automatically discover carrier audio messages in a large set of pre-connected audio recordings may be applied in the support process of media services for a contact center environment. For example, this can assist with the call analysis process for a contact center and removes the need to have humans listen to a large set of audio recordings to discover new carrier audio messages.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for fundamental frequency transfer learning in model training in a text to speech synthesis system using deep neural networks with lesser nodes and hidden layers for obtaining high quality output comprising the steps of:
   training a larger model using long short-term memory and multi-layer perceptron feed-forward hidden layer modeling;
   identifying and extracting fundamental frequency values for voiced and unvoiced regions from the larger model;
   transferring and applying the fundamental frequency values for voiced regions extracted from the larger model in training a smaller model; and
   applying the smaller model in the text to speech system for real-time speech synthesis output.

2. The method of claim 1, wherein the training of the larger model utilizes three feed-forward hidden layers.

3. The method of claim 2, wherein the three feed-forward hidden layers comprise one or more of: 1024 nodes and a long short-term memory hidden layer comprising 512 nodes.

4. The method of claim 1, wherein the fundamental frequency values are continuous values.

5. The method of claim 4, wherein the zero and undefined values for unvoiced regions are not applied.

6. The method of claim 1, wherein the training of the smaller model utilizes three feed-forward hidden layers.

7. The method of claim 6, wherein the three feed-forward hidden layers comprise one or more of: 128 nodes and a long short-term memory hidden layer comprising 256 nodes.

8. The method of claim 1, wherein the transferring and applying of the fundamental frequency values further comprises applying a hyperbolic tangent activation function in the lower layers and a linear activation function at the output layer.

9. A method for fundamental frequency transfer learning in model training in a text to speech synthesis system using deep neural networks with lesser nodes and hidden layers for obtaining high quality output comprising the steps of:
   training a first model using feed-forward hidden layer modeling;
   identifying and extracting fundamental frequency values for a plurality of regions of speech input using the first model;
   transferring and applying the fundamental frequency values for the specified regions of the plurality of regions extracted from the first model in training a second model, wherein the first model is larger than the second model; and
   applying the second model in the text to speech system for real-time speech synthesis output.

10. The method of claim 9, wherein the training of the first model utilizes three feed-forward hidden layers.

11. The method of claim 10, wherein the three feed-forward hidden layers comprise one or more of: 1024 nodes and a long short-term memory hidden layer comprising 512 nodes.

12. The method of claim 9, wherein the fundamental frequency values are continuous values.

13. The method of claim 12, wherein the zero and undefined values for unvoiced regions are not applied.

14. The method of claim 9, wherein the training of the second model utilizes three feed-forward hidden layers.

15. The method of claim 14, wherein the three feed-forward hidden layers comprise one or more of: 128 nodes and a long short-term memory hidden layer comprising 256 nodes.

16. The method of claim 9, wherein the transferring and applying of the fundamental frequency values further comprises applying a hyperbolic tangent activation function in the lower layers and a linear activation function at the output layer.

* * * * *